I. S. DEMENT.
REGISTERING AND RECORDING DEVICE FOR METERS AND THE LIKE.
APPLICATION FILED FEB. 28, 1912.

1,165,578.  Patented Dec. 28, 1915.
9 SHEETS—SHEET 3.

Witnesses.
Franklin E. Low.
Horace A. Crossman.

Inventor:
Isaac S. Dement.

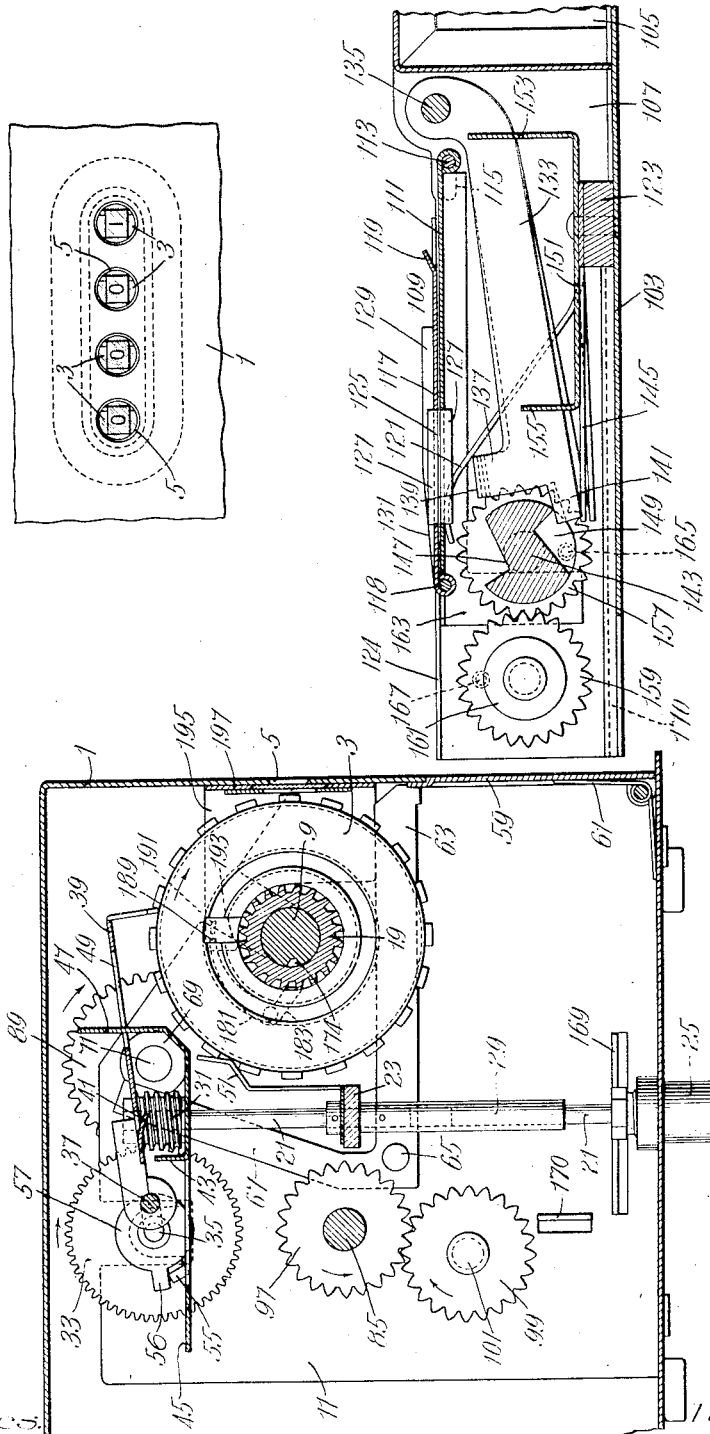

I. S. DEMENT.
REGISTERING AND RECORDING DEVICE FOR METERS AND THE LIKE.
APPLICATION FILED FEB. 28, 1912.

1,165,578.

Patented Dec. 28, 1915.
9 SHEETS—SHEET 5.

Witnesses
Franklin E. Low
Horace A. Crossman

Inventor:
Isaac S. Dement
by Emery Booth Janney Varney
Attys

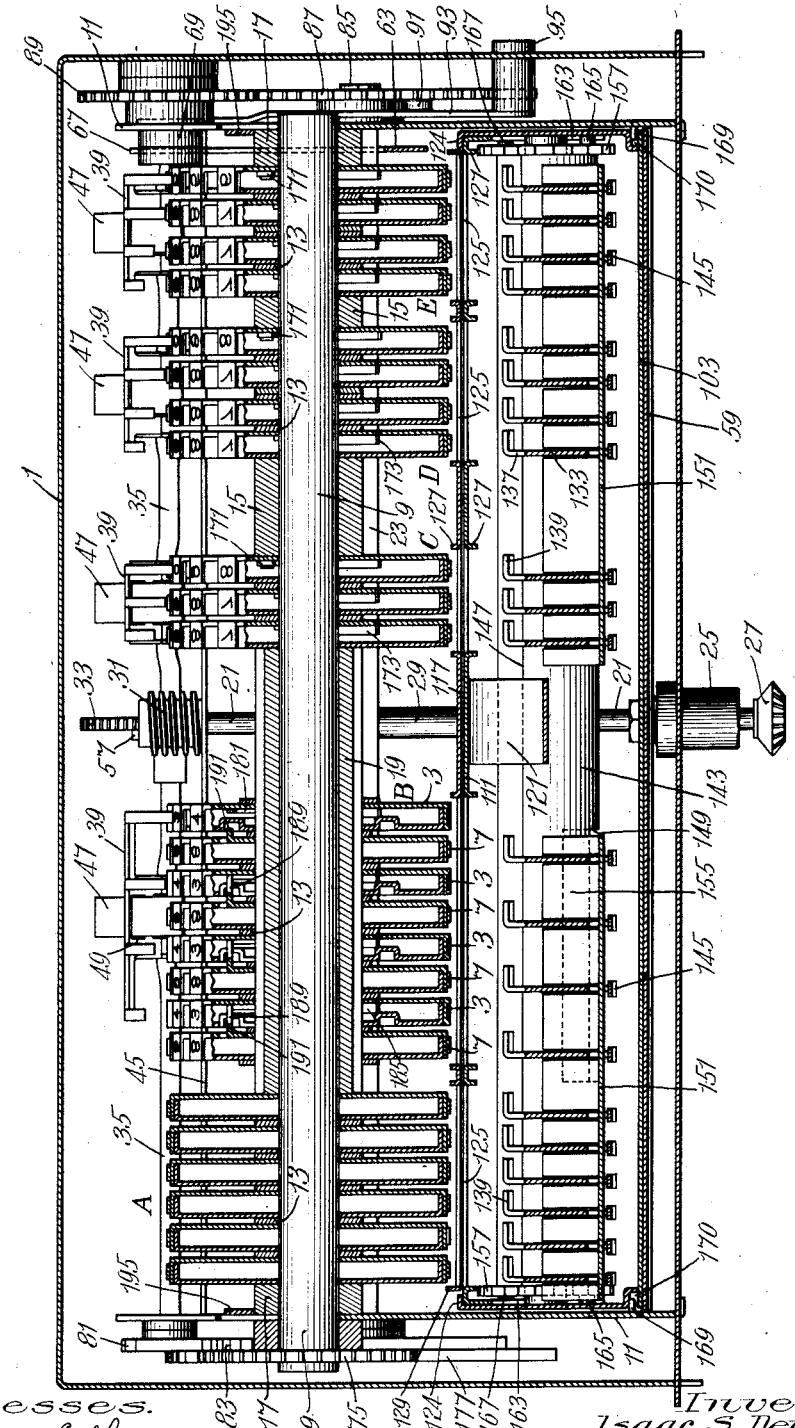

I. S. DEMENT.
REGISTERING AND RECORDING DEVICE FOR METERS AND THE LIKE.
APPLICATION FILED FEB. 28, 1912.
1,165,578.
Patented Dec. 28, 1915.
9 SHEETS—SHEET 7.
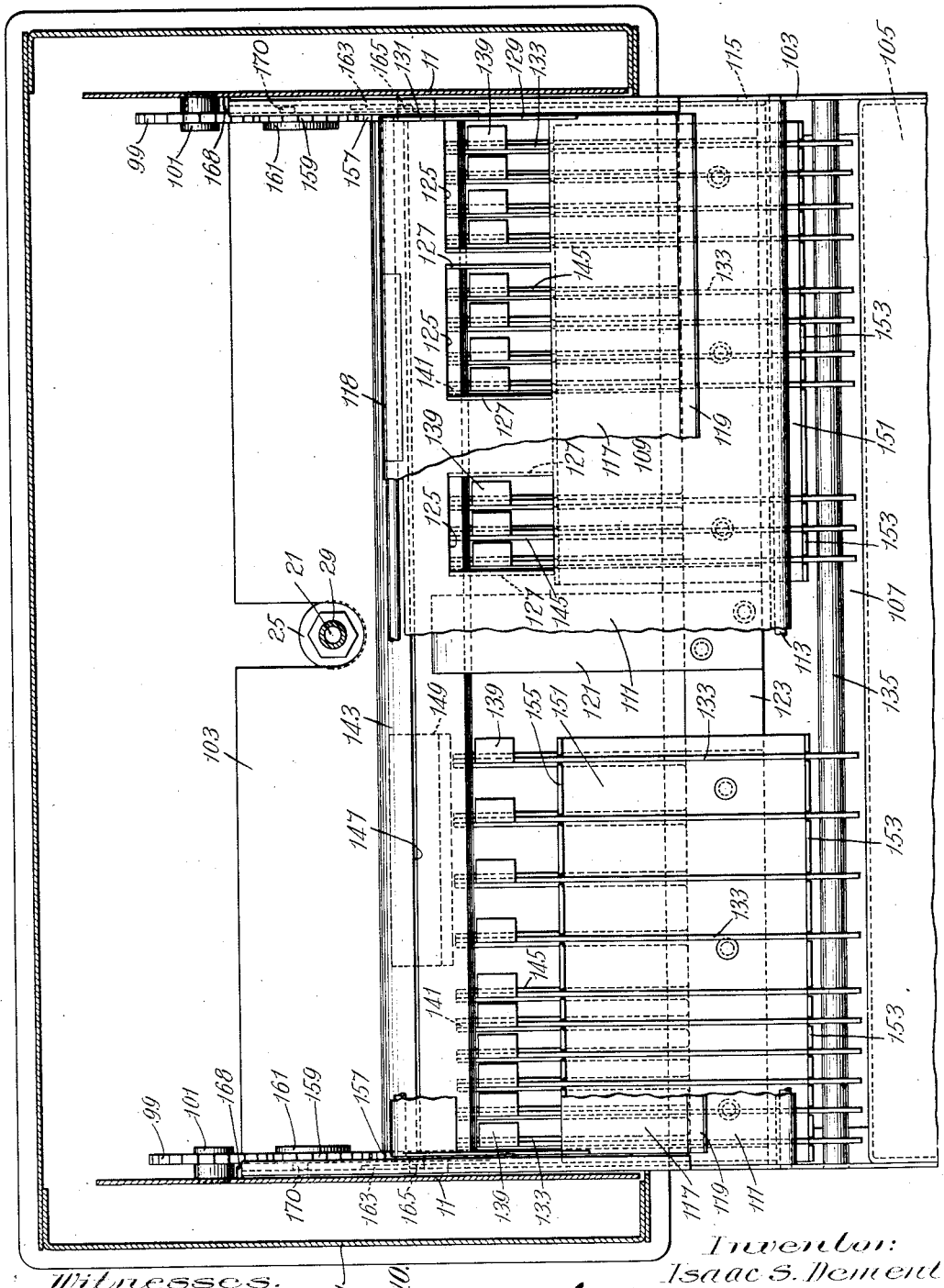

I. S. DEMENT.
REGISTERING AND RECORDING DEVICE FOR METERS AND THE LIKE.
APPLICATION FILED FEB. 28, 1912.
1,165,578.
Patented Dec. 28, 1915.
9 SHEETS—SHEET 8.
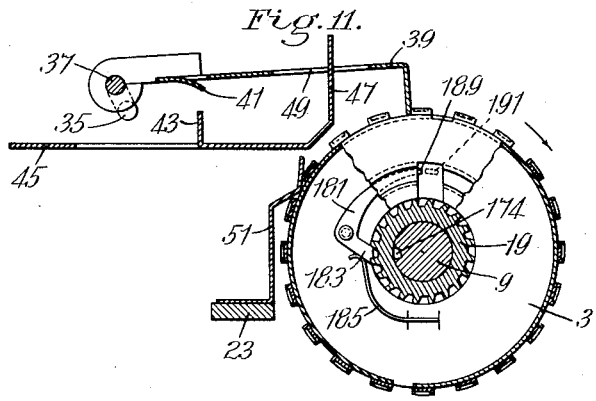
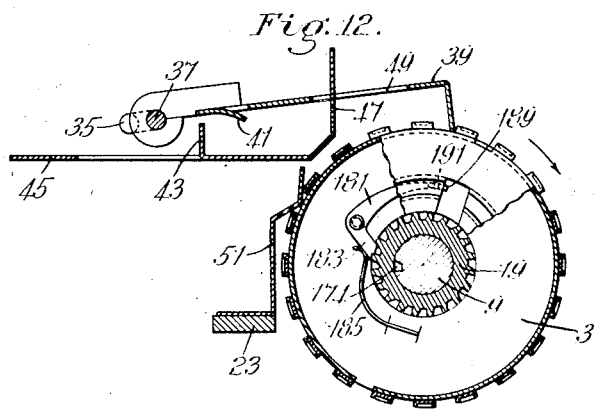
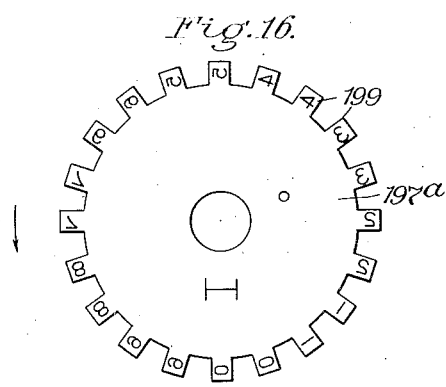
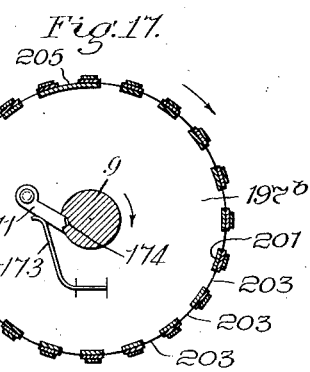
Witnesses.
Franklin E. Low.
Horace A. Crossman.
Inventor:
Isaac S. Dement.
by Emery, Booth, Janney & Varney
Att'ys I. S. DEMENT.
REGISTERING AND RECORDING DEVICE FOR METERS AND THE LIKE.
APPLICATION FILED FEB. 28, 1912.
1,165,578.
Patented Dec. 28, 1915.
9 SHEETS—SHEET 9.
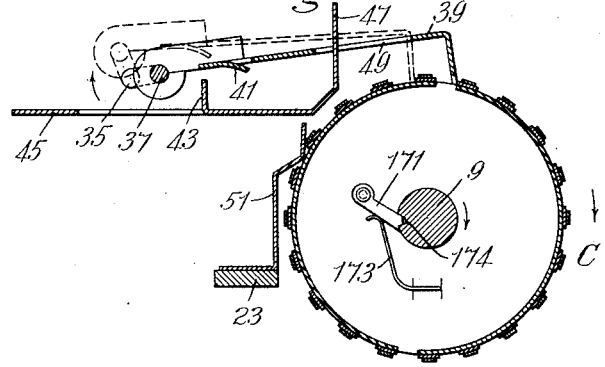
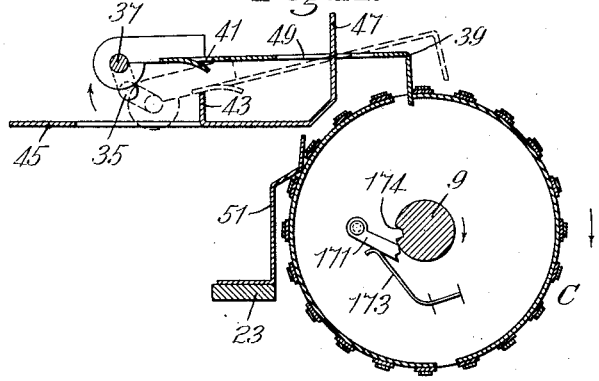
Fig. 15.
| A | B | | | | | C | D | E |
|---|---|---|---|---|---|---|---|---|
| Meter No. | Present Reading | | | | | Amt. Used | Regular Bill | Discounted Bill |
| 0 0 4 1 6 0 | 0 | 1 | 2 | 0 | 0 | 0 | | | |
|  | 0 | 0 | 6 | 0 | 0 | 0 6 0 0 0 | $ 0 0 6.0 0 | 0 5.7 0 |
|  | Last Reading | | | | | Cu. Ft. | $1.00 Per 1000 Cu.Ft. | $.95 Per 1000 C.F. |
Witnesses.
Franklin E. Low
Horace A. Croseman
Inventor:
Isaac S. Dement.
by Emery, Booth, Janney & Varney
Att'ys ized in
UNITED STATES PATENT OFFICE.

ISAAC S. DEMENT, OF CHICAGO, ILLINOIS.

REGISTERING AND RECORDING DEVICE FOR METERS AND THE LIKE.

1,165,578. Specification of Letters Patent. Patented Dec. 28, 1915.

Application filed February 28, 1912. Serial No. 680,481.

*To all whom it may concern:*

Be it known that I, ISAAC S. DEMENT, a citizen of the United States, and a resident of Chicago, county of Cook, and State of Illinois (whose post-office address is 325 Dearborn street, Chicago, Illinois), have invented an Improvement in Registering and Recording Devices for Meters and the like, of which the following description, in connection with the accompanying drawings, is a specification, like characters on the drawings representing like parts.

Figure 1:
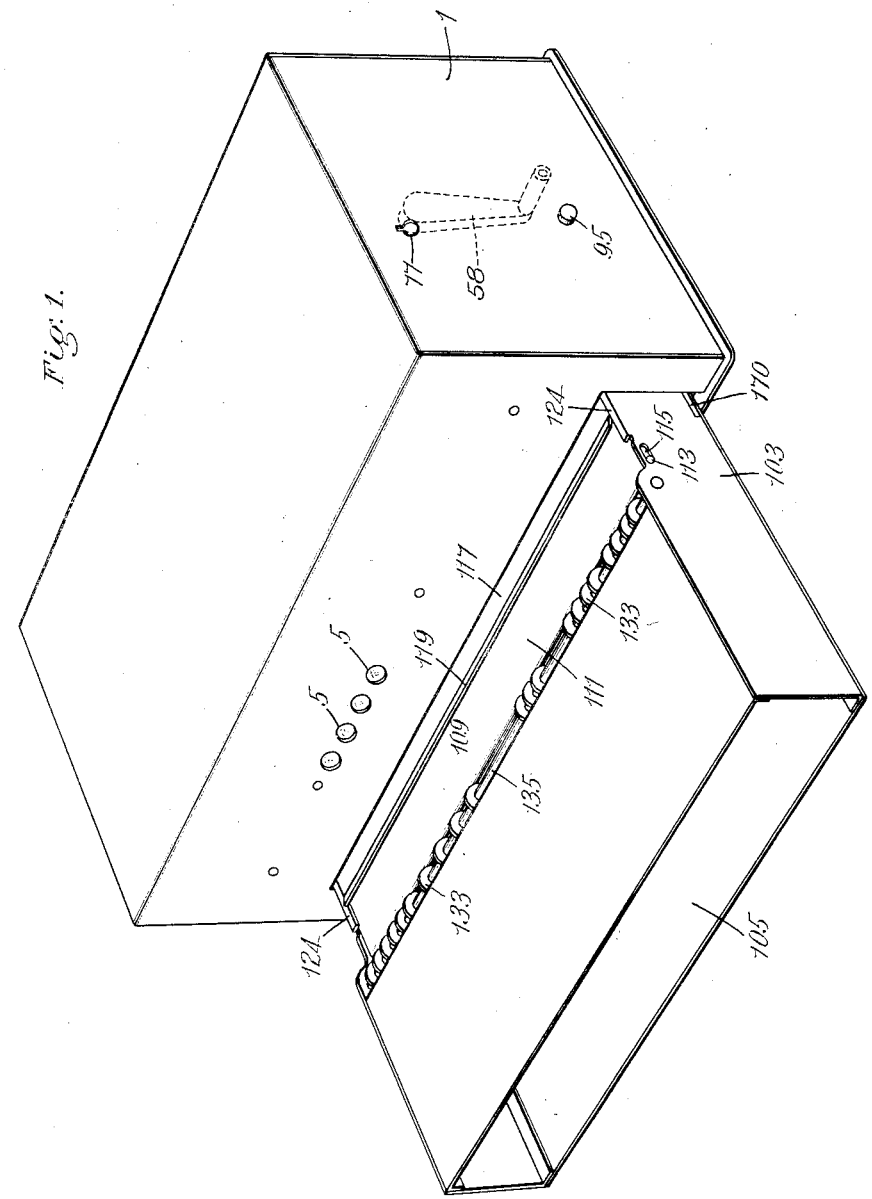
Figure 2:
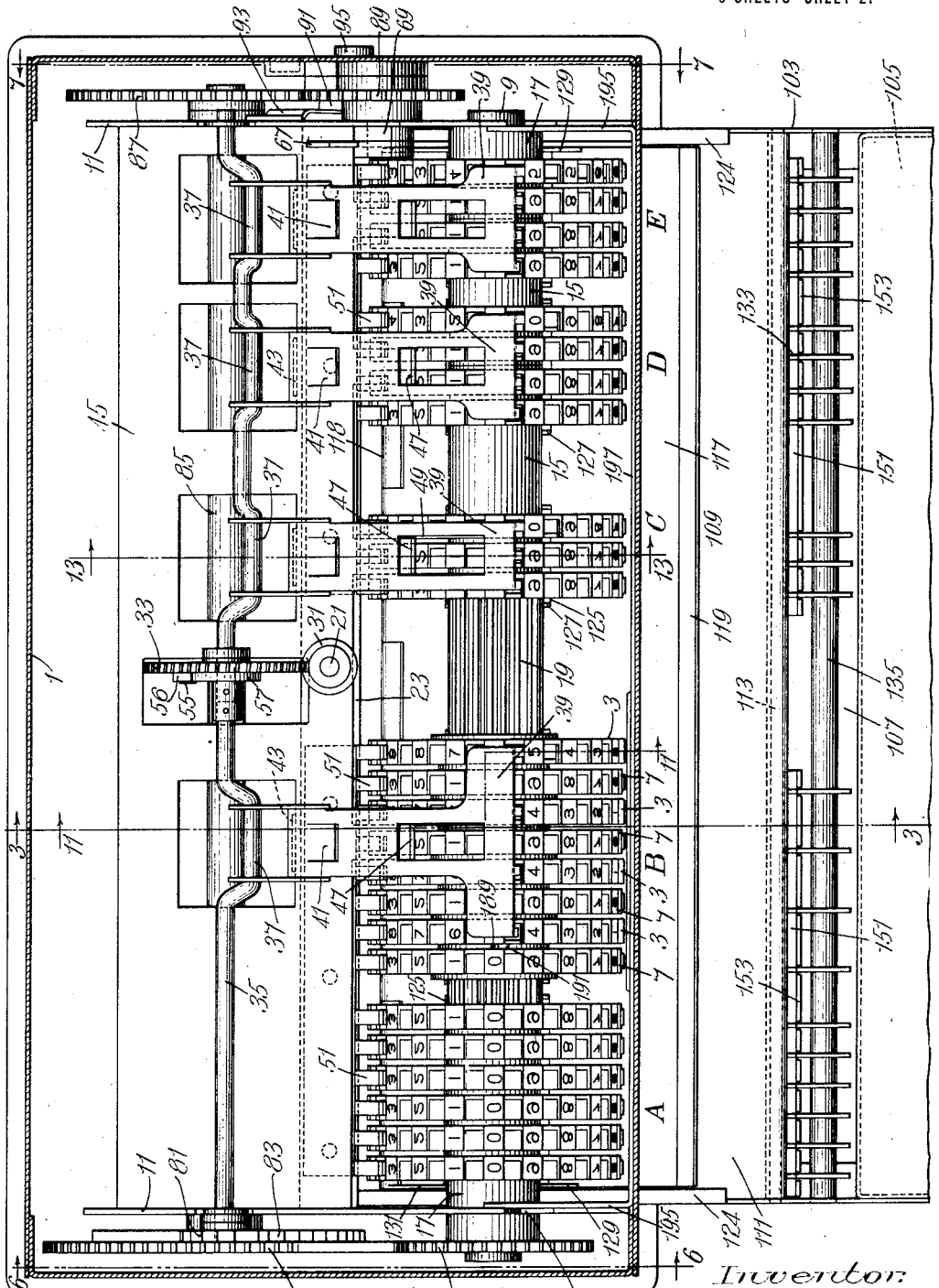
Figure 3:
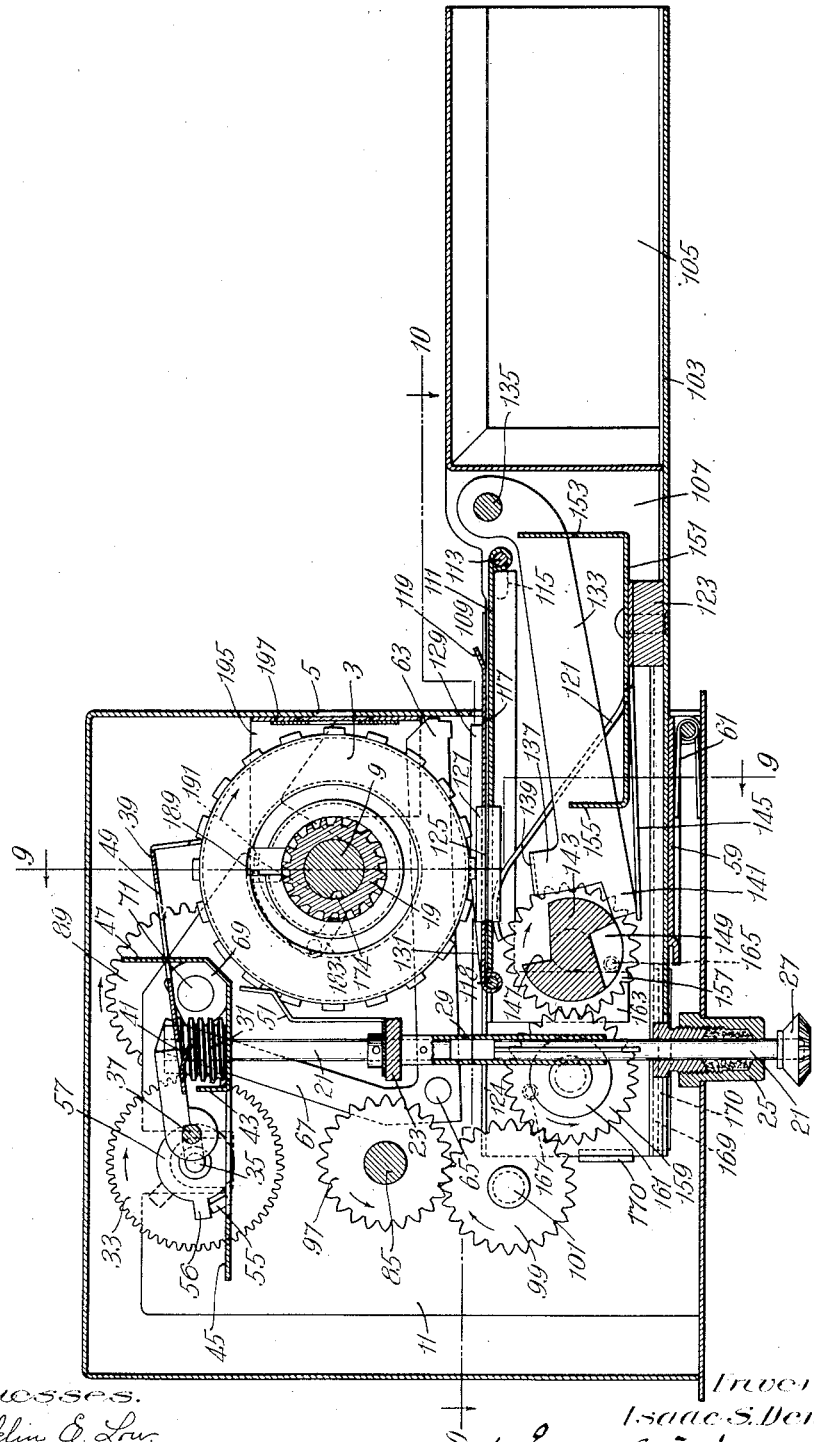
Figure 6:
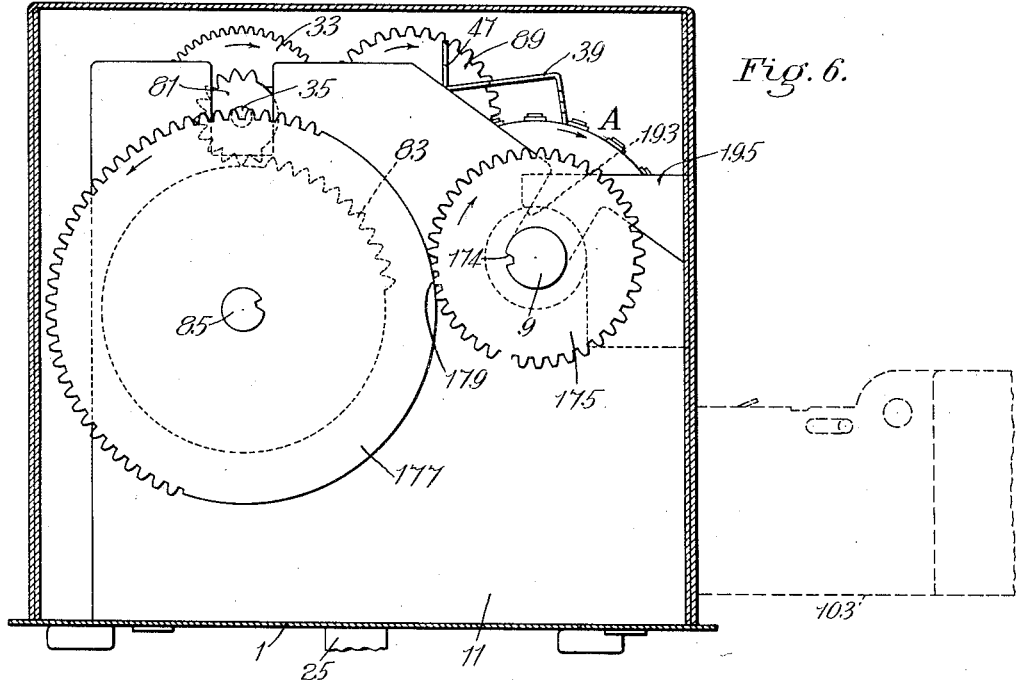
Figure 8:
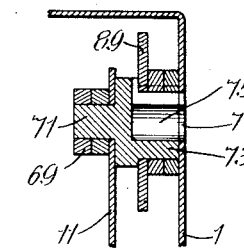
Figure 7:
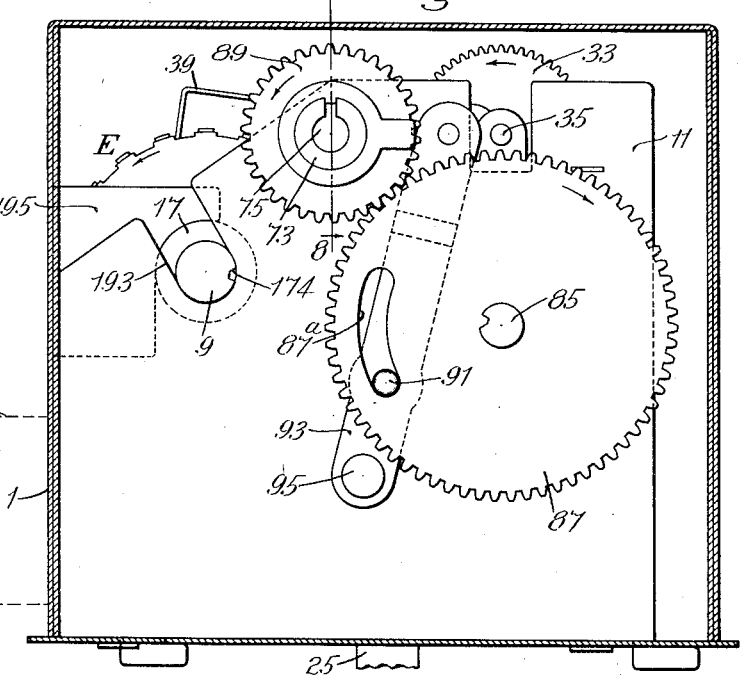

This invention relates to registering and recording devices used in connection with gas, electricity or other meters for the measurement of service, and among other objects provides a device which is simple in construction, efficient in operation and capable of economical manufacture.
The character of the invention may be best understood by reference to the following description of an illustrative embodiment thereof shown in the accompanying drawings, wherein:
Figure 1 is a perspective view showing the exterior of a casing inclosing a mechanism shown herein as embodying the invention; Fig. 2 is a horizontal section directly beneath the top of the casing showing a plan view of the mechanism contained in the casing; Fig. 3 is a vertical transverse section taken on line 3—3 of Fig. 2; Fig. 4 is a similar view showing parts in different positions; Fig. 5 is a detail view to be referred to; Fig. 6 is a vertical transverse section taken on line 6—6 of Fig. 2; Fig. 7 is a vertical section taken on line 7—7 of Fig. 2; Fig. 8 is a sectional detail taken on line 8—8 of Fig. 7; Fig. 9 is a vertical section taken on line 9—9 of Fig. 3; Fig. 10 is a horizontal section taken on line 10—10 of Fig. 3; Fig. 11 is a sectional detail taken on line 11—11 of Fig. 2; Fig. 12 is a view similar to Fig. 11 showing the parts in different positions; Fig. 13 is a sectional detail taken on line 13—13 of Fig. 2; Fig. 14 is a view similar to Fig. 13 showing the parts in different positions; Fig. 15 shows an illustrative record sheet used in connection with the machine; and Figs. 16 and 17 are details of wheels to be referred to.

Referring to the drawings, the illustrative machine shown therein as embodying the invention comprises a casing 1 (Fig. 1), adapted to be secured to a usual meter and containing a registering mechanism including register wheels (Fig. 2), each preferably comprising a numeral lug sheet metal member and a flanged sheet metal member having carrying apertures therein and of the general construction described and claimed in United States Letters Patent No. 956,891, granted to me May 3, 1910. These register-wheels preferably are divided into groups as follows: Group A, adapted to be set to represent the number of the meter in connection with which the machine is used; group B, comprising sight wheels 3 driven from the meter as hereinafter described and adapted to continuously present a reading corresponding to that of the meter and visible through apertures 5 (see Fig. 5) in the casing; and record making wheels 7 herein alternating with said sight wheels and adapted to remain normally stationary and be set at times to positions corresponding with said sight wheels so that a record can be taken therefrom on one sheet of both the present and last previous readings of the meter; group C, comprising meter driven wheels representing the amount or quantity of gas, electricity or other service measured between the present and last readings; group D, comprising meter driven wheels representing the cost of the service represented in quantity by group C; and group E, comprising meter driven wheels representing the discount cost of the service represented by group C.

As shown herein, all of the above described groups of wheels are loosely mounted on a normally stationary shaft 9 (Fig. 9) journaled in bearings in end plates 11. The wheels composing each group are held in spaced relation by thin washers 13; groups C, D and E are held in spaced relation as groups by wider washers 15; and groups A and B are spaced from said end plates 11 by washers 17. Groups A, C, D and E are loosely mounted directly on shaft 9, whereas group B is loosely mounted on a long ratchet toothed sleeve 19 fast on said shaft 9. This sleeve has a main function more fully hereinafter described, but incidentally extends beyond said group B in opposite directions and holds groups A and C properly spaced from group B.

As stated, the sight wheels 3 of the B group, and groups C, D and E are driven by the meter. To so drive these there may be provided a shaft 21 (Figs. 2, 3, 4, 9 and 10) extending vertically upwardly into the casing substantially midway between the ends thereof, said shaft being journaled in a bearing in a frame member 23 extending from end to end of the machine and secured to the frame plates 11 referred to. Said shaft projects down through a lower bearing 25 (Fig. 4) through the bottom of the casing, and has fast on the end thereof a bevel pinion 27 adapted to be placed in mesh with a similar pinion (not shown) on the meter. To permit the machine to be readily connected to meters under varying conditions, preferably the shaft 21 is not continuous, but divided into two parts splined to a sleeve 29, thereby permitting the part carrying the bevel pinion 27 to slide downwardly into engagement with and conform to the position of the corresponding meter pinion. Fast on the upper end of the shaft 21 is a worm 31 for driving a worm wheel 33 loosely mounted on a horizontal shaft 35 journaled in bearings in the end plates 11 and having offset bends 37 constituting cranks on said shaft opposite the register wheel groups B, C, D and E. To transmit step-by-step movements from said shaft cranks to the wheels of said groups there may be provided arms 39 conveniently stamped, of sheet metal, and having ends apertured to receive said cranks and opposite free ends provided with comb teeth of different lengths for engagement with the numeral bearing lugs on said wheels to advance the same, and adapted to drop into peripheral apertures in said wheels to carry from a wheel of lower denomination to one of higher denomination in the usual manner. To prevent contact of said teeth with said numeral bearing lugs on retreating movements of said arms and thereby prevent liability of disturbing said wheels and prevent wear on said numerals or lugs, each of said arms may be provided with spurs 41 (Figs. 11, 12, 13 and 14) conveniently incised and bent down out of the sheet metal of said arms and adapted to engage and wipe over fulcra 43 incised out of and bent up from a horizontal frame plate 45 extending between and secured to the end plates 11 referred to. In the course of the rotation of said cranks in a clockwise direction (Fig. 14) they will bring the arm spurs down into engagement with said fulcra 43 and as the arms are retreated in readiness to advance said wheels new steps, said spurs will wipe over said fulcra and the free comb ends of said arms will be rocked up out of engagement with said numeral lugs. On the forward movements of said arms their spurs will be lifted by said cranks up out of engagement with said fulcra and the comb teeth thereof will be free to drop down into engagement with said wheels and advance the same. To contribute to the control of said arms during their movements, guides 47 are provided projecting upwardly from the fulcra carrying plate 45 referred to, through elongated apertures 49 in said arms. To prevent overthrow of said register-wheels and contribute to the accurate step advance thereof, spring detents 51 may be provided having V shaped free ends for yielding engagement with shoulders formed between adjacent numeral lugs and having opposite ends fixed to the ribbon-like frame member 23 extending between and secured to the end plates 11 referred to.

It will be recalled that worm wheel 33 was described as loose on the shaft 35. To transmit rotation from said wheel to said shaft, said wheel is provided with a driving lug 55 (Figs. 2, 3 and 4) projecting from a face of said wheel and adapted to engage with an arm 56 projecting radially from a disk 57 fast on said shaft. This construction permits the shaft 35 to be turned, as more fully hereinafter described, to advance its arm 56 temporarily a predetermined distance ahead of the worm wheel driving lug 55 to prevent rotation of the crank shaft and permit the register-wheels to remain stationary temporarily during a record taking operation. In the meantime the worm wheel lug (under the continuous rotation of said worm wheel by the meter) is overtaking or coming up again into driving engagement with said arm 56.

Having described the mechanism contained in the fixed casing including the register-wheels and the means for advancing the same step-by-step from a meter, I will now describe means for taking a record from said register-wheels. As shown herein, this means performs broadly a succession of record taking steps effected in sequence by a handle or key 58 applied to the machine. For the sake of economy preferably each individual fixed casing is not provided with a record taking mechanism, but a single portable record taking mechanism is provided in a casing separate from that described and adapted for progressive application to any number of such fixed registers. The handle referred to for effecting the series of operations for taking a record preferably is not applied to the portable casing, but rather to the fixed casing as more fully hereinafter described. To permit the introduction of the portable casing to the fixed casing, the latter is made sufficiently large to provide a space beneath the registering wheels. This space is normally closed by a door 59 (Figs. 3 and 4) hinged at its lower end to said casing and yieldingly pressed into closed position (Fig. 4) by a spring 61. To maintain this door normally locked except on record taking operations a bell crank dog is provided, pivoted on a pin 65 carried by one of the end plates 11 and having a locking arm 63 for engagement with the upper free edge of the door and an actuating arm 67 (Figs. 3, 4 and 9) projecting upwardly in said casing along the inner side of said end plate to a flat faced cam 69 fast on a stud shaft 71 (Fig. 8) journaled in said end plate. To turn this cam to operate said lock dog, as more fully hereinafter described, said shaft is provided with a boss 73 containing a key-hole 75 registering with a hole 77 in the machine casing, said key-hole being adapted to receive said handle for effecting the imprinting steps referred to. After the handle is inserted in the key-hole 75, the initial rotation of said handle will rotate the cam 69 from its position shown in Fig. 4 to that shown in Fig. 3, thereby rocking the bell crank lock dog and lifting its arm 63 up out of engagement with the door 59. This will permit the door to be rocked against the resistance of its spring to its open position shown in Fig. 3, as more fully hereinafter described. The initial rotation of the handle is also utilized to effect other operations referred to below.

To advance the crank shaft arm 56 referred to ahead of the worm wheel driving lug 55 to move the register-wheel actuating arms up out of engagement with said wheels to permit the latter to be reset and to prevent actuation thereof while being struck by printing platens to be described, there is provided a partially toothed pinion 81 (Figs. 2 and 6) fast on an end of the crank shaft 35 referred to, said gear being located in the space between one of the end plates 11 and the casing. Coöperating with said partially toothed gear is a larger partially toothed gear 83 also located in said space and mounted fast on a shaft 85 journaled in said end plates and extending across the machine to receive and be driven at the opposite side of the machine by a gear 87 (Fig. 7) fast on said shaft and driven in turn by a smaller gear 89 fast on the key-hole containing boss 73 referred to. By this construction the initial rotation of the handle will cause the rotation of the gear 89 and the large partially toothed gear 83, and in case the teeth of the partially toothed pinion 81 are in mesh with those of the gear 83 (as shown in Fig. 6), rotation will be imparted thereto and to the crank shaft 35. This will advance the crank arm 56 ahead of the worm wheel lug 55 and move the teeth of the register wheel actuating arms up out of engagement with said wheels. The arm 56 will be advanced ahead of the worm wheel driving lug 55 a sufficient distance to provide a sufficient period in which to complete imprinting operations, hereinafter described, before the worm wheel will be driven by the meter a sufficient distance to cause the lug 55 to overtake and again come into driving engagement with the arm 56.

In the event that at the time of making the record taking operations the register-wheel actuating arms are already up out of engagement with said register-wheels or are not about to advance the same an increment, it will not be necessary to advance the crank arm 56 ahead of the worm wheel driving lug 55. At such a time the smooth portion of the crank shaft partially toothed pinion will be opposite the gear 83 and rotation of the latter will be ineffective to impart rotation to said pinion. Thus the partially toothed pinion 81 will be rotated during some record taking operations, but not during others, depending on the positions of the register-wheel actuating arms at the time of taking the record.

To determine the commencement and completion of the series of record taking steps the wheel 87 is provided with an arcuate slot 87$^a$ adapted to receive a stop pin 91 projecting from the face of a resilient arm 93 having one end secured to one of the end plates 11 and its opposite or free end provided with a release button 95 normally pressed by the inherent resilience of said spring through an aperture in the casing and accessible for operation from the exterior of said casing.

Before the casing door can be unlocked or any other operations effected by said handle it is necessary to press said button 95 to depress the stop pin 91 from the slot 87$^a$. The gear 87 may then be rotated by the handle actuated gear 89. In the course of the rotation of the gear 87 the end of the stop pin 91 will contact with and wipe along the face of said gear until the slot 87$^a$ again reaches said pin, whereupon the latter, under the action of the spring 93, will enter said slot and again engage the end of said slot and stop further rotation of the wheel, thereby automatically marking the completion of the operations to be effected by the handle. The handle 58 referred to has a key or rib for insertion into a similarly shaped slot in the key hole aperture of the casing, said rib being interrupted so that the handle cannot be removed from the key hole until it has returned to the position which it had on insertion.

While the printing mechanism is contained in a portable casing separate from that containing the registering mechanism, yet it is found convenient to actuate or drive the printing mechanism from the fixed casing. To transmit the drive to the printing mechanism by the handle there are provided fast on the shaft 85 two gears 97 (Figs. 3 and 4) located adjacent the inner sides of the end plates 11. These gears drive similar gears 99 mounted on stud shafts 101 carried by the end plates 11.

Having described the registers, the means for driving the same from a meter; the lock control of the casing door; the provision for lifting the driving claws up from the register wheels, and the mechanism for transmitting the drive from the handle to the printing mechanism, I will now describe the latter, having more particular reference to Figs. 3 and 4. This mechanism comprises a portable casing 103 conveniently divided into a compartment 105 constituting a record sheet magazine and a compartment 107 containing the record taking mechanism, the latter compartment being open at the top and at one end. To receive the record sheet a tray or pocket 109 is provided, comprising a table 111 of sheet metal having one end secured to a hinge shaft 113 extending across the casing into elongated slots 115 to permit the tray to be fed a line space, as more fully hereinafter described. To retain the record sheet in place said table 111 is provided with a cover 117 hinged at 118 to the opposite or free end of said table, and having an upturned lip 119 to facilitate the introduction of the record sheets under said cover. To yieldingly hold said tray in a horizontal position and retard feeding movements thereof there may be provided a wide leaf spring 121 having one end (Figs. 3, 4 and 10) fast to a ribbon block 123 riveted or otherwise secured to the bottom of the casing 103 and having its free end inclining toward the free end of the record sheet receiving tray 109, said spring tending to rock said table on the shaft 113 as a fulcrum, upward movement thereof being limited by the engagement of the side edges of said tray with inturned flanges 124 of said portable casing 103. To permit the platens to strike a record sheet contained in said pocket the table 111 and cover 117 are provided with registering apertures 125 (Fig. 10) corresponding to the printing wheels of the register groups A, B, C, D and E. To strengthen and stiffen said tray and cover the sheet metal thereof is bent at the sides of said apertures to provide stiffening ribs 127. To lock the portable casing into the fixed casing and prevent interference by said ribs with the insertion of the portable casing into the fixed casing, as more fully hereinafter described, the cover 117 is provided with side guides 129 having abrupt shoulders, and inclines 131 tapering gradually toward the free ends of the record sheet receiving table. To take a record from the register-wheels a series of platens is provided herein in the form of hammers 133 having ends pivoted on a shaft 135 extending across and fixed to the sides of the portable casing and free upturned ends 137 having platen faces 139 of rubber or other suitable material. To control the movements of these hammers they are provided with heels 141 pressed into engagement with a cam 143 by leaf springs 145 having ends fixed to the block 123 referred to and free ends for engagement with said heels.

In taking a record an imprint is made preferably in one line from the meter number of the wheels of the group A, from the normally stationary printing wheels of the group B, and from the amount, cost and discount cost groups C, D and E. The present reading of the wheels of the B group, continuously advanced from the meter, is then transferred to said normally stationary wheels, and on a different line is printed merely the present reading of the meter. Thus it will be apparent that all of the printing hammers must be actuated to print the first line referred to and merely those hammers opposite the printing wheels of the B group for printing the second line referred to. To operate the hammers in this manner the cam 143 is provided with a long notch 147 extending the length of the cam for operating the hammers to print the long line, and a short notch 149 extending a portion of the length of said cam for operating a second time the hammers of the group B for printing the second line. On a complete rotation of said cam 143 the heels of the hammers will be pressed by the truly cylindrical portion of the cam down against the resistance of the leaf springs 145 until the notch reaches said heels, whereupon the hammers will be freed and thrown by their springs toward the printing wheels with sharp, quick blows. On continued rotation another cylindrical portion of said cam will engage and again press the heels of said hammers down against the resistance of their springs until the short notch 149 reaches the heels of the hammers of the B group, whereupon said hammers will be released and forced by their springs again toward the register-wheels to print the short line referred to. To maintain said hammers in proper spaced relation a double guide 151 may be provided secured to the block 123 and having long legs 153 near the hammer shaft 135 and short legs 155 near the free ends of said hammers. It will be observed that the hammer actuating spring 145 are directly beneath this guide 151. As a result the movements of said springs will be limited by said guide and will not follow the hammers throughout their imprinting strokes. As a result the platens of the hammers will strike the wheels with clean, quick blows and will be free to rebound quickly away from said wheels.

To rotate the cam to effect the long and short line imprints described there are provided fast on the cam shaft adjacent the ends thereof, gears 157 (Figs. 3, 4 and 10) and meshing therewith gears 159 retained by caps 161 on stud shafts carried by the portable casing 103. To make certain that the record sheet receiving tray 109 referred to is properly positioned prior to printing the long line referred to and to feed said tray a line space prior to printing the short line referred to, said tray is provided with positioning means, herein comprising arms 163 depending from said tray at the opposite ends thereof in line with the points of meshing engagement of the cam actuating gears 157 and 159. Arms 163 are positioned to be in the path of travel of wrist pins, about to be described. To make sure that the tray is in proper position to print the long line, the gears 157 are provided with wrist pins 165 projecting from faces thereof and so positioned that shortly previous to the arrival of the cam notch 147 at the hammer heels 149 for printing the long line, said pins will have moved in a clock-wise direction through an arc of 90 degrees from their positions shown in Fig. 4 and in the course of this movement will engage the right hand one of the vertical edges of said arms 163 (indicated by broken lines as back of cam 143), and make certain that the tray is in position for the printing of the long line.

To move the record sheet receiving tray a distance corresponding to the line space between the short and long lines printed, the cam actuating gears 159 are provided with similar pins 167 projecting from the faces of said gears and so arranged that during interval while the cam 143 is being turned from the long notch 147 to the short notch 149 the pins 167 will engage edges of the arms 163 and move the record sheet receiving tray 109 to the right of Fig. 4 a distance corresponding to a line space so that when the hammer heels are released by the short cam notch the record sheet will have been placed automatically in proper position to receive the short line imprint.

As stated, the portable casing is adapted to be introduced through the door 59 of the fixed casing before effecting a record taking operation. To guide the portable casing and properly position the same in the fixed casing the latter is provided with lower guides 169 adapted to enter grooves 170 in the portable casing, inward movement of the latter being limited by end stops 170.

After the door lock 63 is released the portable printing unit casing may be presented to said door and on pressure will force said door in from its position shown in Fig. 4 to its open position shown in Fig. 3, and on continued insertion, its open end will engage the end stops 170 and the cam actuating gears 159 will come into mesh with the transmission gears 99 carried in said fixed casing as shown in Fig. 3. The record sheet receiving pocket and platen hammers may then be controlled through the train of mechanism contained in the fixed casing for driving the gears 99 by the operating handle referred to.

As previously stated, the sight wheels of the register group B are continuously driven from the meter and always represent the present reading of the meter. The amount, cost and discount cost—designated herein as the C, D and E groups—do not not always present the meter reading, but merely the amount used and cost and discount cost of the amount for certain periods,—such for example, in the case of a gas meter, as a monthly period. In order that the C, D and E groups may start from zero at the commencement of each such period or after the taking of a record it is desirable to automatically return said groups to zero after taking a record therefrom. To this end each of the wheels of the C, D and E groups is provided with reset means herein comprising (Figs. 13 and 14) a reset pawl 171 pivotally mounted within each wheel and pressed by a spring 173 toward the wheel carrying shaft 9 referred to, said shaft being provided with a notch or tooth 174 extending longitudinally thereof as shown in Letters Patent No. 1,070,427, granted to me August 19, 1913. As stated, the wheels of these groups are advanced step-by-step from the meter through the instrumentality of the crank arms 39 while the shaft 9 is normally stationary. As a result, the pawls 171 will wipe around the staft and over the notch 174 without effect, but when said wheels are stationary, as in the course of an imprinting operation, and after the platen hammers have struck the same to effect an imprinting of the long line, the shaft 9 is rotated in a clock-wise direction, by connections to be described, from the handle referred to, and in the course of this clock-wise rotation the notch 174 will pick up the pawls 171 of the different wheels and in the course of a complete rotation of said shaft 9 will turn said wheels so that the zero numerals thereon are in one line and directly above said hammer platens.

To rotate the shaft 9 from the handle there is provided fast on said shaft a gear 175 (Fig. 6) coöperating with a gear 177 fast on the shaft 85 referred to and having a partially smooth and partially toothed circumference. To maintain normally stationary the gear 175 and its shaft 9, said gear 175 is provided with a circumferential concavity 179 adapted to be engaged by the smooth portion of the gear 177. As a result while the smooth portion engages said concavity the gear 175 will be locked against rotation, but the gear 177 will be free to be rotated and its toothed portion may be brought into mesh with the gear 175. The gear 177 is twice as large as the gear 175 and has teeth throughout an arc of 180 degrees, so that on a half rotation of the gear 177 the gear 175 is given a complete rotation and on the occurence of this event will reset the amount, cost and discount cost groups C, D and E to zero. The gear 177 is driven from the handle through the gears 89 and 87 and shaft 85 referred to, and the gears 175 and 177 are so arranged that the shaft 85 may be rotated to transmit sufficient rotation to the hammer actuating cam to effect the printing of the long line before the toothed portion of the gear 177 will be brought into mesh with the gear 175, whereupon the latter is turned a complete rotation to reset said groups to zero as above described.

It will be recalled that the long line includes not only an imprint of the meter number, amount, cost and discount cost groups, but also the past reading of the meter as had by a printing impression taken from the printing wheels of the B group which have remained stationary all the time since the taking of the last record. To move this normally stationary group of wheels to positions corresponding to the sight wheels, the latter are given a complete rotation so that they return to the positions which they had before this rotation. Means is provided for picking up, during the course of this rotation, the normally stationary wheels and thereby bringing the latter to positions corresponding to the sight wheels. To this end each of the sight wheels is provided with a pawl 181 pivotally mounted therein and having a heel 183 pressed into engagement with the ratchet sleeve 19 referred to by a spring 185. This pawl also has a toe or offset free end 189 projecting through an aperture in said sight wheel and adapted for engagement with a lug 191 projecting from a face of the print wheel adjacent thereto.

The sight wheels as driven step-by-step from the meter are turned in a clock-wise direction and the shaft 9, and ratchet sleeve 19, being maintained normally stationary, cause the pawl heel 183 to wipe in and out of the spaces between the ratchet teeth and impart a rocking movement to said pawl toe 189 so that in the course of the advance of the wheel, when the pawl reaches the lug 191 of the stationary print wheel, it will dodge the same and leave said wheel stationary, but when the shaft 9 is turned to reset the amount, cost and discount cost groups C, D and E to zero, the pawl 181 will not rock but its heel will remain between teeth of said ratchet and as a result the wheel carrying the same will be connected to said ratchet and will be turned therewith in a clock-wise direction. In the course of this movement the toe of said pawl will not dodge the lug of the normally stationary wheel adjacent thereto, but will engage and pick up the same and move said wheel to a position corresponding with its sight wheel. When all of the print wheels are so moved they are in positions in readiness to be struck by the hammers to print on the short line the present reading of the meter. In order that the print wheels may present numbers down opposite the platens or at the printing point the same as numbers on the sight wheels opposite the sight apertures located 90 degrees from the printing point, the pawl toes of the sight wheels and the lugs of the print wheels may be arranged offset on their wheels relatively to their numerals, to position said wheels as described.

From the above it will be seen that a complete rotation of the shaft 9 by the handle through the connections described has the dual function of resetting the amount, cost and discount cost groups C, D and E to zero, and setting the normally stationary print wheels from positions corresponding to the last previous reading of the meter, to positions corresponding to the present reading of the meter.

The rates of service, as for example gas service, vary from time to time, and to provide for this variation different wheels may be substituted in the D and E groups. To this end the shaft 9 may be journaled in open bearings 193 in said side plates 11 as shown in Figs. 3, 4, 6 and 7, and may be normally retained therein by side plates 195 overlying said shaft and bent in from a reinforcing plate 197 extending along and secured to the front of the fixed casing. It will be observed that the whole mechanism contained in the fixed casing is carried by the side plates 11 which are mounted on the base of the casing 1. To substitute wheels on the shaft 9 it is, therefore, merely necessary to detach and lift the top and sides of the casing as a whole from said base, whereupon the open bearing closing plates 195 will be lifted from the shaft 9 and the latter may be readily lifted out of its open bearings and the wheels thereon may be removed and replaced as desired.

Any suitable form of record sheet may be employed in the machine and may have any suitable printed matter or spacing desired. Preferably the record sheets employed will be of thin paper folded in two ply form with carbon sheets interposed between to produce duplicate records,—one to be kept by the company and the other to be handed to the customer. As shown herein the record sheet is divided into five spaces corresponding to the A, B, C, D and E groups for receiving imprints of the meter number, the present and last readings, the amount used, the regular bill and the discount bill. In the illustrative record sheet shown in Fig. 15 the meter number was 4,160, the last reading was 6,000 cubic feet, the present reading was 12,000 cubic feet, the amount for the last month, or the difference between the present and last readings, was 6,000 cubic feet, the cost at a rate of $1 per thousand cubic feet was $6 and the discount cost at a rate of 95¢ per thousand cubic feet was $5.70.

From the previous description, it will be apparent that the register-wheels do not move continuously with the meter, but are driven step-by-step therefrom. It is found convenient to advance the register one step after 100 cubic feet of gas has passed through the meter. The amount group B will therefore add increments of 100 cubic feet. Since the amount for a month or other period will always be a certain number of hundred cubic feet there will always be zeros in the units and tens places of the number. To reduce the number of register-wheels necessary, wheels need not be included in the register for printing said zeros, but the latter may be previously printed and form a part of the form of record sheet used.

Gas rates vary from time to time, but are usually in multiples of 5; as for example, 50¢, 60¢, 65¢, . . . 85¢, 90¢, or 95¢ per 1000 cubic feet. In 100 there are 20 increments of 5. In order that a complete rotation of a wheel of the cost groups may provide a total of an even hundred or hundreds, for the various rates based on multiples of 5 the wheels used preferably contain twenty numeral lugs instead of ten. Since there are twenty numeral lugs on the wheels of the cost groups, for the sake of uniformity it is desirable to have a similar number of numeral lugs on all of the other groups.

To explain the way in which the machine automatically computes the cost of the amount of gas or other service used, it may be supposed that the gas rate is 90¢ per 1000 cubic feet of gas. The cost of 100 cubic feet would therefore be 9¢. Therefore when the amount register B advanced a step corresponding to 100 cubic feet the cost register C may be advanced a step presenting 9¢, and preferably the steps of the two registers are simultaneous. Thus when the amount and cost registers have each advanced their first increments a record therefrom would show that 100 cubic feet of gas has been consumed and that the cost thereof was 9¢. When they have advanced their second increments a record therefrom would show that 200 cubic feet of gas has been consumed and the cost thereof was 18¢, etc. If the rate instead of being 90¢ per 1000 cubic feet is 95¢ per 1000 cubic feet, the cost for 100 cubic feet would be 9½¢. To eliminate fractions of cents in registering such a rate, an increment of 9½¢ is not added, but instead thereof alternate increments of 9 and 10¢, the mean of which obviously is 9½¢. As a result, the deficiency caused by the reduced rate in one place is made up by the greater rate in another place and a slight deficiency in the cost of one record will be compensated for by a greater cost in another record, and therefore the rate so figured is entirely practical.

As shown herein the discount cost is computed at a rate of 95¢ per 1000 cubic feet and illustrates the varying or alternately different rates referred to above. To illustrate the arrangement of the numerals on the hundredths wheel of the discount group employing such rate, reference may be had to Figs. 16 and 17 of the drawing wherein are shown sheet metal members $197^a$ and $197^b$ of the hundredths wheel of the discount cost group D, one of said members having radial numeral lugs 199 thereon and the other having a flange 201 for receiving said lugs. Said lugs are shown in Fig. 16 bent into the plane of the body of the member in order to readily disclose the numerals thereon. The flange member is provided between lugs with carrying apertures 203 between each of the lugs thereon (with one exception at 205) for permitting a long tooth of the comb tooth driving arm to drop and permit the engagement of the next adjacent and shorter tooth with the tenths wheel to advance the latter a step each time that the hundredths wheel is advanced a step excepting when the hundredths wheel is being advanced from zero to 9, when of course it is not necessary to advance the tenths wheel an increment, the flange portion 205 preventing such advance. On the first increment advance of said hundredths wheel "9" will be presented opposite the printing point; on the second increment advance the long tooth of the comb arm will drop into one of the apertures 203 and will simultaneously advance the hundredths and tenths wheels increments (adding 10), presenting "19" at the printing point. On the third increment advance said long tooth will drop again and both the hundredths and tenths wheels will be advanced another increment (adding 9) and "28" will be brought opposite the printing point. And so on, alternate increments of 9 and 10 will be added until the completion of a rotation of the hundredths wheel, whereupon the total cost registered will be $1.90. The numbers or cost values thus progressively registered are as follows: 9, 19, 28, 38, 47, 57, 66, 76, 85, 95, 1.04, 1.14, 1.23, 1.33, 1.42, 1.52, 1.61, 1.71, 1.80 and 1.90. The discount cost wheels are of course advanced step-by-step simultaneously and preferably in synchronism with the amount and cost wheels.

Where the regular bill rate is $1 per 1000 cubic feet the rate of each 100 cubic feet would be 10¢. It is not essential to provide a wheel for printing each time the zero which would occur in the hundredths place, and therefore the zero of such place may be previously printed and be a part of the record sheet form used. Also the dollar sign and decimal points may be previously printed and form parts of the form of record sheet used.

The meter of each customer will be provided with a fixed casing and its contained mechanism, said casing being preferably permanently secured to the casing of the meter with the bevel gear 27 of the register driving shaft in mesh with a corresponding gear on the meter, whereupon the sight wheels of the B group and the wheels of the amount, cost and discount cost groups C, D and E may be advanced step-by-step by the crank shaft and its comb toothed arms.

A representative of the gas company will be provided with the portable printing unit mechanism and will visit each customer and take a record from the register in the fixed casing of each meter in the following manner: First, a record sheet will be selected from the supply contained in the record sheet magazine and will be introduced into the record sheet receiving tray 109. The key portion of the handle is then introduced to the key-hole 75 and the button 95 is pressed to withdraw the stop pin 91 from the gear slot 87$^a$ permitting the gear 87 to be turned by the gear 89. The initial turning movement of the handle will cause the cam 69 to unlock the dog 63 from the door 59. The open end of the portable casing is then presented to and pressed on the door against the resistance of its spring and slipped into the casing until arrested by engagement of its end with the stops 170. On the occurrence of this event the cam driving gears 159 will have been brought into mesh with the transmission gears 99 in the fixed casing. In the course of the insertion of the portable casing into the fixed casing the inclines 131 of the side guides 129 will wipe along the upper edge of the opening of the fixed casing and depress the record sheet receiving table against the resistance of its spring until the abrupt shoulders of said guides pass beyond said opening edge, whereupon the table springs upwardly, thereby locking the portable casing in the fixed casing. To remove the portable casing from the fixed casing it is merely necessary to press the table downwardly against the resistance of its spring sufficiently to remove said shoulders from engagement with the opening edge. Also the door spring will tend to press the door and portable casing upwardly and present a frictional resistance to accidental displacement or withdrawal of the portable casing from the fixed casing.

Continued rotation of the handle will effect the following series of operations: First, the initial rotation of the handle 85 will rotate the partially toothed gear 83 and pinion 81, rotating in turn the crank shaft to advance the driving arm 56 thereof ahead of the worm wheel driving lug 57 to withdraw the comb toothed arm out of engagement with the register wheels providing they are not already in such positions. Second, the rotation of the shaft 85 will transmit rotation to the hammer actuating cam gears 157 and by the pins 165 thereof and the depending arm 163 of the record sheet receiving tray, make certain that the tray is in proper position for the long line imprint including the meter number, past reading, amount, cost and discount cost readings. Third, continued rotation of the handle will cause the long notch 147 to reach the hammer heels 141 and release the same to the action of their springs for printing the long line referred to. Fourth, continued rotation of said handle will cause the teeth of the partially toothed wheel 177 to come into mesh with the teeth of the gear 175 and impart thereto a complete rotation, causing the resetting of the amount, cost and discount cost groups C, D and E to zero and the setting of the normally stationary print wheels of group B to positions corresponding with the sight wheels giving the present reading of the meter. But while this setting rotation occurs the print cam is rotated, causing a cylindrical portion thereof to engage the heels of the printing hammers and causing the short notch to approach said heels. Fifth, in the course of this rotation the pins 167 of the cam driving gears 159 engage the depending arms 163 of the record sheet tray 111 and move the same to the right (Fig. 3) a line space. Sixth, continued rotation of said shaft brings the short notch of the cam opposite the hammer heels and releases the hammers to make a record of the present reading of the meter above the last reading thereof. The handle may be rotated slightly farther to permit a cylindrical portion of the cam to engage the hammer heels and energize the hammers, whereupon further rotation of the handle will be prevented by the springing of the pin 91 (Fig. 7) into the gear slot 87$^a$. On occurrence of this event the flat side of the door lock dog cam 69 will be opposite the actuating arm of said dog, whereupon the portable casing may be withdrawn from the fixed casing, the removal thereof permitting the door 59 to be rocked by its spring 51 to closed position, where it is locked by the dropping of the dog 63 behind the same. The portable casing is then carried to the meter of the next customer to be visited, where the operations above described are repeated.

The casing and most of the parts therein are preferably stamped from sheet metal and therefore may be manufactured on a large scale very cheaply, and the provision of one printing unit common to and for progressive application to a series of fixed register units further cheapens the construction.

The machine is simple in construction, effective and certain in operation.

In machines of this nature it is important that they should be immune from tampering and should give assurance to the customer that the bills presented to him accurately record the amount of service for the various periods.

The provision of mechanism for automatically recording the present and last readings on one statement in one operation is a very advantageous feature since the customer can take two successive bills and by their comparison determine whether the "last reading" of the later one tallies with the "present reading" of the older one. As a result he has an absolute check on the gas company and has no feeling of uncertainty regarding the authenticity of his bills such as at present exists among patrons of gas companies. Another advantageous feature of this machine is the fact that the customer, upon receipt of a bill, may at once compare it with the meter reading itself.

It will be understood that all of the features of the mechanism need not be used conjointly, but that for some purposes some features thereof may be used separately to advantage. If desired, the printing mechanism shown herein instead of being mounted in a portable casing may be permanently mounted in the fixed casing without any substantial change in the mechanism.

Having described one illustrative embodiment of the invention without limiting the same thereto, what I claim as new and desire to secure by Letters Patent is:

1. A meter register comprising, in combination, a manually operable shaft, a group of register wheels driven by a meter, a group of normally stationary printing wheels, all said wheels loosely mounted on said shaft, and means consisting of mechanisms interposed between said printing wheels and said shaft whereby operation of said shaft moves determined ones of said printing wheels to a recording position which corresponds with the position indicated by said register wheels, for transferring the reading of said register wheels to said printing wheels, and means including platens which are operated by the operation of said shaft, for making a record from said printing wheels, before and after said transfer.

2. A meter recorder comprising, in combination, a shaft, a ratchet sleeve fast thereon, a group of registering wheels driven step-by-step from the meter and a pawl on each of said registering wheels having a heel for engagement with said ratchet and adapted to be rocked on each step movement of its wheel, a group of normally stationary wheels having lugs in the path of the pawls of said registering wheels avoided by the rocking of said pawls on the step advance of said registering wheels, but engaged by said pawls on the rotation of said registering wheels through said sleeve and pawls.

3. The combination of a register, a meter driven shaft, a crank shaft, means for transmitting movements from said crank shaft to said register, means for taking a record from said register and means to transmit the drive from said meter driven shaft to said crank shaft, said means having provision operated by said record taking means for advancing said crank shaft momentarily ahead of said meter driven shaft.

4. The combination of a register, a meter driven shaft having a worm thereon, a shaft having a worm wheel loose thereon driven by said worm, means to transmit movements from said worm wheel shaft to said register, means to drive said worm wheel shaft from said worm wheel and having provision permitting said latter shaft to be advanced ahead of said meter driven shaft and means to take a record from said register having provision for advancing said worm wheel shaft ahead of said meter driven shaft.

5. The combination of a meter driven shaft, a worm on said shaft, a worm wheel intermeshing with said worm and having a lug projecting from a face thereof, a shaft, an arm fast on said shaft for engagement with said lug, to transmit rotation from said worm wheel to said shaft, a register having numerals thereon, means to drive said register from said worm wheel driven shaft and means to take a record from said register having provision for advancing said shaft arm ahead of said worm wheel lug to prevent rotation of said shaft from said meter driven shaft during a record taking operation.

6. The combination of a casing, a meter driven register therein, a door in said casing, means comprising a cam driven dog to lock said door, a portable record taking unit for introduction through said door into said casing to take a record from said register and means comprising a shaft, a cam and a handle adapted to turn said shaft and cam, for unlocking said door and coöperating with said unit for effecting a record taking operation after the introduction of said unit into said casing.

7. The combination of a casing, a register therein and a portable record taking mechanism for introduction to said register and comprising platen means and cam means for operating the same; and gear means carried partly by said casing and partly with said portable mechanism for operating said cam means from said casing.

8. The combination of a casing for fixed relation with a meter, a register in said casing, a portable record taking mechanism for introduction to said register and comprising platen means and means for actuating the latter including a gear; and a gear in said casing for engagement therewith for operating said platen means from said casing.

9. The combination of a register; and means to take readings of present and last readings of said register including record sheet receiving means and means for automatically feeding the latter a line space during the interval between the recording of the present and last readings of said register.

10. The combination of a normally stationary shaft, registers carried thereby, a gear fast on said shaft and having a peripheral concavity, a second shaft, a gear having a toothed portion and a smooth portion for locking engagement with said concavity, means to drive said registers from a meter, a normally stationary register having characters thereon corresponding to one of said registers, means to take a record from all of said registers and means operating through said gears and shafts for resetting some of said registers to zero, and moving said normally stationary register to a position corresponding to one of said meter driven registers, said record taking means having provision for taking a record from said normally stationary register in its latter position.

11. The combination of a normally stationary shaft, registers carried by said shaft, means to drive said registers from a meter, a register normally stationary to register a last reading, means to move the same to register the present reading, means to take a record from all of said registers, means to return some of said registers to zero and move said normally stationary register to a position corresponding to the present reading of the meter, and means to take a record from said normally stationary register in its new position.

12. The combination of a normally stationary shaft, a group of wheels carried thereby, means to drive said wheels from a meter, another group of wheels carried by said shaft and normally stationary to register the last reading of the meter, means to move said normally stationary group to a position corresponding with the present reading of said other group and means to take a record from said normally stationary group before and after it is so moved.

13. The combination of a shaft, a group of wheels thereon, means to drive the same from a meter, a normally stationary group of wheels on said shaft, means including a gear fast on said shaft and a partially toothed gear coöperating therewith for moving said stationary group from a position representing a past to a position representing a present reading of the meter, and means to take records from said normally stationary group before and after it is so moved.

14. The combination of a shaft, a group of register wheels thereon, means to drive said wheels from a meter, a group of normally stationary wheels on said shaft and means to move said normally stationary wheels from a position representing the past to a position representing the present reading of the meter and including a gear fast on said shaft having a peripheral concavity and a partially toothed gear having a smooth portion for engagement with said concavity to hold the latter stationary, and means to rotate said partially toothed gear to move said normally stationary group from a position representing a past to a position representing a present reading of the meter, and means to take a record from said normally stationary group before and after it is so moved.

15. The combination of a shaft, register wheels carried thereby, and means to drive the same from a meter, normally stationary register wheels on said shaft and means to move the latter from a position representing the past to a position representing the present reading of the meter including a gear fast on said shaft, a partially toothed gear and means for taking a record from said normally stationary wheels before they are moved, means for rotating said partially toothed gear to move said normally stationary wheels to positions corresponding with said meter driven wheels, and means for taking a record from the former after they are so moved.

16. The combination of a shaft, a group of normally stationary wheels thereon, another group of wheels thereon, means to drive the latter from a meter while said normally stationary group is stationary, means to take a record from said normally stationary group and said meter driven group, means to reset said meter driven group to zero, means to advance said normally stationary group an amount corresponding to the advance of said meter driven group, and means to take another record from the former after it is so advanced.

17. The combination of a shaft, a register thereon normally stationary to present the last reading of a meter, a meter driven register on said shaft, means simultaneously to take a record from both of said registers, means to reset said meter driven registers to zero, means to advance said normally stationary register an amount corresponding to the last period of advance of said meter driven register, and means to take a record from said normally stationary register after it is so moved.

18. The combination of a shaft, a group of wheels thereon normally stationary to represent a past reading of a meter, groups of wheels on said shaft for registering the amount and cost of service, means simultaneously to take a record from all of said groups, means to reset said amount and cost groups to zero, means to advance said normally stationary wheels an amount corresponding to the last advance of said amount wheels, and means to take a record from said normally stationary wheels after they are so advanced.

19. The combination of a shaft, a group of wheels thereon normally stationary to represent a past reading of a meter, groups of wheels on said shaft for registering the amount, cost and discount cost of service, means to take a record from all of said groups, means to reset said amount, cost and discount cost groups to zero, means to advance said normally stationary wheels an amount corresponding to the last advance of said amount group, and means to take a record from said normally stationary wheels after they are so advanced.

20. The combination of hollow register wheels driven by a meter, normally stationary wheels having lugs thereon, and pawls pivotally mounted within said hollow register wheels and adapted to engage said lugs to transfer a reading from said register wheels to said normally stationary wheels.

21. The combination of a normally stationary shaft, hollow register wheels loose thereon driven by a meter, normally stationary wheels having lugs thereon, and pawls pivotally mounted within said hollow register wheels, and adapted for engagement with said lugs to transfer a reading from register wheels to said normally stationary wheels, and springs for pressing said pawls into engagement with said ratchet.

22. The combination of register wheels driven by a meter, normally stationary wheels, means operable through said register wheels for moving said register wheels without changing their position relative to each other and by said moving transferring a reading thereof to said normally stationary wheels, and means to take a record from said normally stationary wheels before and after said transfer.

23. The combination of a register driven by a meter, a normally stationary recording register, means for transferring a reading from said meter driven register to said recording register with merely momentary loss of the reading of said meter driven register, and means for taking a reading from said recording register before and after such transfer.

24. In a machine of the class described, the combination of a wheel comprising a numeral lug carrying member, a flanged member coöperating therewith, a ratchet and a spring pressed pawl pivotally mounted within said wheel between said members and having an end pressed by said spring into engagement with said ratchet, and an end for effecting a transfer operation.

25. In a machine of the class described, the combination of a ratchet, numeral carrying wheels, one having a lug projecting from the face thereof and the other having a spring pressed pawl pivotally mounted within the same, said pawl having an end pressed by said spring into engagement with said ratchet and an end for engagement with said lug on rotation of said ratchet for transferring a reading of one of said wheels to the other.

26. In a machine of the class described, the combination of wheels, each comprising a numeral lug carrying member and a flanged member spaced apart, a ratchet, a projection on one of said wheels, a pawl pivotally mounted between members of another of said wheels and having an end for engagement with said ratchet and a free end adapted to engage said projection and transfer a reading from one of said wheels to the other.

27. In a machine of the class described, the combination of an elongated ratchet, wheels loosely mounted thereon each comprising a numeral lug carrying member and a flanged member secured thereto, a lug on one of said wheels and a pawl pivotally mounted within said other wheel and having a spring pressed end for engagement with said ratchet and a free end projecting outside of said wheel for engagement with said lug for transferring the reading from one of said wheels to the other.

28. In a machine of the class described, the combination of a ratchet, numeral wheels each comprising sheet metal members spaced to provide a chamber between them, a lug projecting from one of said wheels and a pawl pivotally mounted within the other and having a spring pressed end for engagement with said ratchet and a free end for engagement with said lug to transfer a reading from one of said wheels to the other.

29. A meter recorder comprising, in combination, a register adapted to be driven by a meter, a casing containing said register and having a door therein, locking means for said door; record taking mechanism comprising platen means, means for controlling the same, record sheet receiving means, means for feeding the latter a line space and a handle initially movable to unlock said door and further movable to operate said record taking mechanism.

30. A meter recorder comprising, in combination, registers adapted to be driven from a meter and record taking mechanism comprising platen means, means for taking successive records from one of said registers by said platen means, record sheet receiving means, means for feeding the same a line spaced between said successive records, means to change the position of one of said registers between said successive records and a handle movable continuously to effect said record taking operation.

In testimony whereof, I have signed my name to this specification, in the presence of two subscribing witnesses.

ISAAC S. DEMENT.

Witnesses:
D. F. LINNEEN,
HENRY W. HUNT.